June 27, 1967 T. H. KELLY 3,327,441
INSULATING PANEL ASSEMBLY WITH A RESINOUS
IMPREGNATED SUPPORT MEMBER
Filed Dec. 27, 1963

INVENTOR.
THEODORE H. KELLY
BY
ATTORNEY

United States Patent Office 3,327,441
Patented June 27, 1967

3,327,441
INSULATING PANEL ASSEMBLY WITH A RESINOUS IMPREGNATED SUPPORT MEMBER
Theodore H. Kelly, Princeton, N.J., assignor to Union Carbide Corporation, a corporation of New York
Filed Dec. 27, 1963, Ser. No. 333,905
8 Claims. (Cl. 52—309)

This invention relates to an insulated structural member of low thermal conductivity, such as a composite member made up of metal elements separated by a rigid insulating material and bound together by a reinforced plastic envelope, for use in insulated structures.

The design of the commercially available insulated structure for low temperature service has involved a compromise between structural strength, insulating efficiency, durability and wall thickness. Considerable effort and ingenuity has been expended in an effort to devise a strong structural member which would not introduce a thermal "short-circuit" or heat path through the insulation.

Insulating materials, by themselves, generally lack the structural strength, durability and resistance to the elements which are necessary to a sturdy container. Attempts have been made to construct truck bodies of rigid plastic foam sandwiched between an inner and an outer skin. Such sandwich panels may have good insulating properties, but it is difficult to devise a means of attaching one panel to another which is both strong and free of thermal short-circuits. The effect of the wide temperature difference of, for example, 0° F. within the container and 90° F. without, has, on occasion, caused the walls to distort in service due to the contraction of the inner skin of the panel.

Thus, it has been necessary to add support means such as beams of a stiffer material. Wood has been used but the moisture which is likely to collect in the walls tends to cause the wood to swell and contract and it is likely to rot in service. The use of metal beams has been restricted due to the high thermal conductivity thereof. I-beams and channels have accordingly been constructed by riveting or bonding angles to a plastic laminate which acts thereby as a break in the thermal path. For example, an I-beam made in this way would have the thermal break or interruption in the stem of the "I," the laminate serving to complete the stem. The cost of assembly is high, however, and the legs of the angles of the warm and cold sides approach each other rather closely along the stem, limiting the gap of the thermal break and the effectiveness thereof. Moreover, because of the irregular shape of the assembly, it is difficult to fit the main body of the insulation closely against the beam thus leaving an air space in which convective currents, adverse to insulation, may be established. There is, therefore, a considerable commercial need for a structural element that has substantially none of these shortcomings.

Accordingly it is an object of this invention to provide an insulating panel assembly having a structural member therein of high strength and low thermal conductivity.

These and other objects are accomplished in the present invention which provides an insulating panel assembly having a structural member comprising an assembly of a beam of rigid insulating material and a plurality of metal bars longitudinally bound together, said bars being bound on opposing surfaces of said beam so that at least one of said bars is separated from the remainder thereof by substantially the breadth of said beam, said bars and said beam being bound together by a combination of durable, tear-resistant, wrapping material of low thermal conductivity and a thermosetting binder impregnated in said wrapping material.

The invention will become more apparent from the following detailed specification and the drawings, in which.

Figure 1:
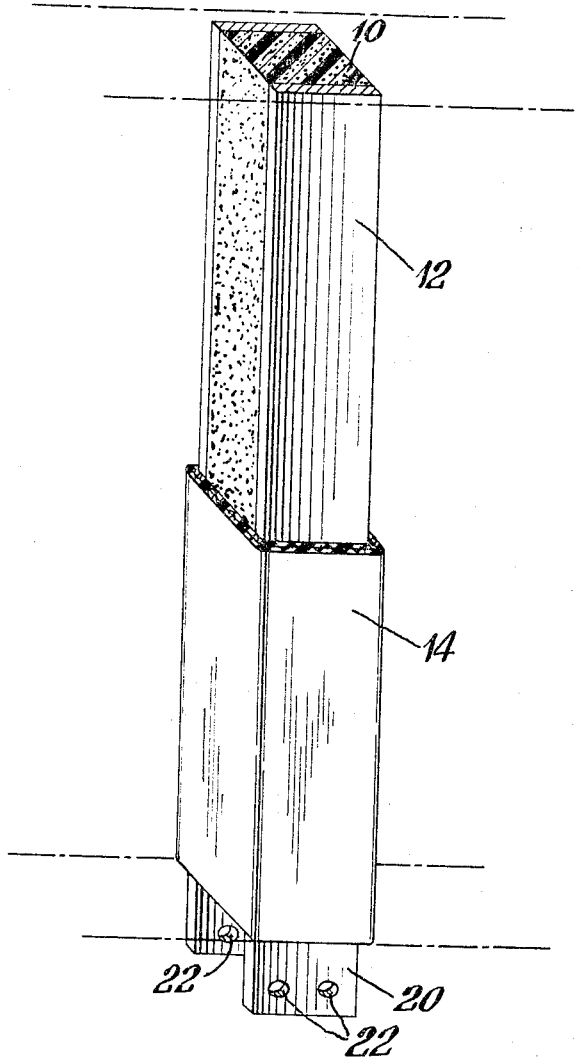
FIGURE 1 is an isometric view of an insulated structural member embodying the invention, showing the plastic foam beam, the metal bars and the wrapping material.
Figure 2:
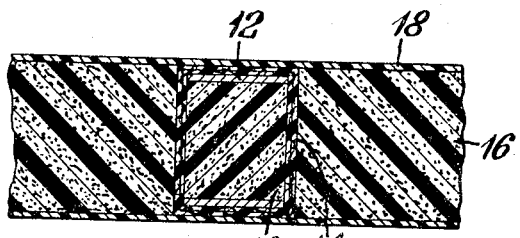
FIGURE 2 is a plan view of the member embodying the invention positioned in an insulated panel.
Figure 3:
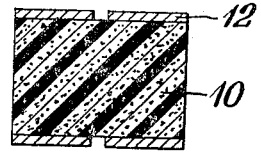
FIGURE 3 is a plan view of another embodiment of the invention where more than two metal bars comprise the structural member.

Referring now to the drawings, the insulated structural member embodying the invention as illustrated in FIGURES 1 and 2, comprises a beam of rigid plastic foam 10 reinforced by metal bars 12 bound therewith by a combination of a wrapping material of low thermal conductivity 14 and a thermosetting binder substantially impregnated therein. The member fits into the main body of insulation 16 and is fixed in place either by a thermosetting binder or by means such as the bar extensions 20 and bolt holes 22 by which the member is anchored to the structure. A skin 18 may then be provided to cover the entire assembly.

Figure 4:
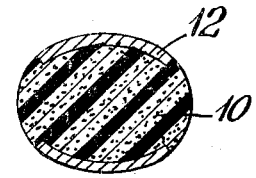
FIGURE 4 shows a plan view of another embodiment of the invention having a circular shape.
Figure 5:
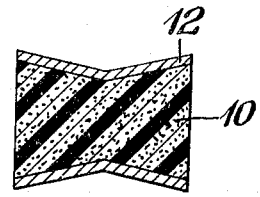
FIGURE 5 shows a plan view of another embodiment of the invention where the bar supports are formed in an angle for greater longitudinal compressive strength.
Figure 6:
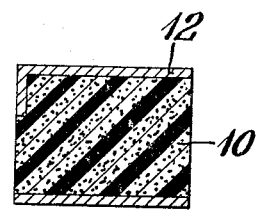
FIGURE 6 shows a plan view of another embodiment of the invention where one bar support is formed in an angle and the other is flat.

This invention may take a number of different forms such as the embodiments shown in the plan views of FIGURES 3 to 6, and the like. The bar reinforcements 12 may be curved in cross-section such as shown in FIGURE 4, semi-circular and the like. In another embodiment the bars may be polyhedral in cross-section including angular, as shown, for example, in FIGURES 5 and 6. The plastic beam 10 may take any conventional form such as circular or polyhedral in cross-section or a combination thereof. The metal bars, which have a high thermal conductivity, and the plastic beam are bound longitudinally together so that at least one bar is separated from the remainder by substantially the breadth of the beam. Preferably, the bars are arranged in one opposing pair or two opposing sets with the opposed bars separated as above. However, the arrangement of the bars may be other than balanced as, for example, where one bar opposes two or a set of two bars opposes a set of three and the opposed bars may lie in other than parallel planes as shown by FIGURES 4 and 5. The opposed bars may include at least one channel or angle bar as shown, for example, in FIGURE 6, provided the opposed bars are separated as above.

The member is placed in the insulated structure so that the bars lie in close proximity with the planes of the panels walls, that is, near the outer surfaces of the panel walls, as shown, for example, in FIGURE 2.

The above described separation of the opposed metal bars is an important feature of this invention for a high degree of insulation is gained thereby. Another key feature of the invention is that the metal bars are bound to the beam and to each other to form a rigid member. If the bars are merely glued or adhered to the foam, the compressive forces exerted, for example, on the structure walls would cause the bars and beam to flex and shear apart and a wobbly structure would result.

The beams may be made of any stiff plastic foam such as polyurethane, polystyrene, phenolic and the like or other suitable stiff insulating material such as preformed resin bonded fibrous glass insulation and the like. The beam is preferably in the form of rigid plastic foam having a density of from 1 to 30 pounds per cubic foot. The term "rigid insulating material" encompasses the above described beam materials.

The bars may be of any convenient rigidifying metal such as steel, aluminum and the like. The bars may be solid or have a plurality of apertures therein, or ridges, striations or other surface modifications in order to improve the grip of the foam and/or the wrapping material about the structure.

In the means of binding the metal bars and the beam together, any strong wrapping material of low thermal conductivity woven, non-woven or unwoven, may be used including webbed and continuous material and filamentary wound fibrous material, such as woven glass fibers or cloth, jute, linen, thermoplastic fibers or sheet and the like. The binder may be any thermosetting resin, such as epoxy resin, phenolic resin or polyester resin, or any other suitable bonding agent.

The metal bars and the beam are assembled and wrapping material, such as cloth, is wrapped around them. The cloth may be wet with the binder before wrapping or the whole member may be assembled dry and impregnated later. After impregnating, the member may be placed in a simple mold until the resin has reacted or it may be molded, in place, in the panel. This latter method of molding the member in the panel enables the resin to bond the member to the adjacent panel surfaces, forming an integral structure. In this way, any large spaces between member and adjacent panel surface are prevented and the possibility of the aforementioned convective currents is substantially removed.

The panel covering or skin 18 is preferably made of fiber glass reinforced epoxy resin laminate. But it may be made of other conventional materials such as reinforced polyester or other plastic laminate, metal, plywood and the like.

A preferred embodiment of the invention comprises a beam of rigid polyurethane foam, rectangular in cross-section, sandwiched between a pair of rectangular steel bars and coextensive therewith. The assembly is preferably bound with wrapping material of fiber glass cloth substantially impregnated with epoxy resin. The resin preferably contains a room-temperature curing, hardening agent which, on thermosetting, cures and hardens the structure into a unitary high strength, low-thermal conductivity member.

What is claimed is:

1. An insulating panel assembly comprising an insulating panel of relatively rigid insulating material and a structural support member comprising a beam of relatively rigid insulating material and a plurality of metal bars longitudinally bound together, said bars being bound on opposing surfaces of said beam so that at least one of said bars is separated from the remainder thereof by substantially the breadth of said beam, said bars and said beam being bound together by a combination of durable, tear-resistant, wrapping material of low thermal conductivity and a thermoset binder impregnated in said wrapping material, said support member being attached to said panel so that the bars of said support member lie in close proximity with the planes of the panel walls, said support member extending substantially from one edge to another of said panel.

2. The support member described in claim 1 wherein the metal bars extend beyond the beam to provide additional attachment means to an insulating structure.

3. The support member described in claim 1 wherein the metal bars have a plurality of apertures therein.

4. The support member described in claim 1 wherein the beam is sandwiched longitudinally between two of said metal bars and aligned coextensively therewith, said beam and said bars each having a rectangular cross-section.

5. An insulating panel assembly as defined in claim 1 having a plurality of panels and structural support members.

6. The assembly of claim 5 wherein said panels and support members are bonded together to form an integral structure.

7. The assembly of claim 5 wherein said panels and support members are bonded together to form an insulated truck body.

8. The support member described in claim 1 wherein said wrapping material is fiber glass cloth and said thermoset binder is an epoxy resin.

References Cited
UNITED STATES PATENTS

| | | | |
|---|---|---|---|
| 2,064,435 | 12/1936 | Loeffler | 52—673 |
| 2,665,455 | 1/1954 | Salo | 52—582 |
| 2,961,478 | 11/1960 | Burns | 52—285 |
| 3,003,810 | 10/1961 | Kloote | 161—150 |
| 3,080,268 | 3/1963 | Bjork | 161—159 X |
| 3,194,708 | 7/1965 | Fourcade | 161—161 X |

FRANK L. ABBOTT, *Primary Examiner.*

JOHN E. MURTAGH, *Examiner.*